United States Patent Office 3,362,905
Patented Jan. 9, 1968

3,362,905
METHOD FOR TREATING SEWAGE AND/OR POLLUTED WATER
Charles L. Gleave, 2226 N. 72nd Place, Scottsdale, Ariz. 85251
No Drawing. Filed June 16, 1965, Ser. No. 464,575
14 Claims. (Cl. 210—11)

This invention relates to a method for treating sewage and/or polluted water and more particularly to a method for treating such sewage and polluted water involving biological disposal of waste materials as well as pathogenic organisms.

Animal excrement is known to contain constituents which are among those requisite for the growth of organisms which will implement aerobic reduction of waste materials, such as sewage and other liquid polluting materials, and pathogenic organisms therein. Since the excrement of animals is readily available and provide economical sources for the production of organisms which will implement aerobic reduction of waste materials, these materials may find widespread utilization for such purposes.

It has now been discovered that when fecal excrements of pregnant cows are treated according to the method of the invention, described hereinafter, compositions can be obtained which are excellent for use in treating sewage and other polluted liquids.

Accordingly, it is an object of the invention to provide a method for treating sewage and polluted water involving a primary treatment of the fecal excrements of pregnant cows, whereby a composition characterized by valuable properties for use in sewage and polluted water treatment is obtained and applied to sewage and polluted waters to greatly reduce all of the objectionable conditions in such sewage and polluted waters and to thereby reclaim the water and dispose of the waste materials therein.

Another object of the invention is to provide a method for treating sewage which is very economical, since the materials used for treating such sewage may be produced from the fecal excretions of animals in dairies.

Another object of the invention is to provide a method for treating sewage which greatly reduces the odoriferous condition existing in sewage plants as compared to such conditions when a sewage disposal plant is treated by conventional chlorine chemical methods.

Another object of the invention is to provide a method for treating sewage and polluted waters which very efficiently disposes of pathogenic organisms in sewage and polluted water.

Another object of the invention is to provide a method for treating sewage and polluted water which is very efficient in the reduction of fats and greases which tend to collect on the surface and the sides of a sewage treatment plant and which also greatly reduces the sludge and solids in the effluent from the plant.

Another object of the invention is to provide a method for treating sewage wherein the maintenance costs of a sewage plant may be reduced.

Another object of the invention is to provide a method for treating sewage and polluted water which attains efficient control of detergent foam on the surface of the water or sewage being treated.

Another object of the invention is to provide a method for treating sewage which renders the water flowing from the plant useful for irrigation or other purposes and renders it substantially free of pathogenic organisms.

A further object of the present invention is a method for treating pregnant cow fecal excrements to provide a composition, and the use of such a composition, for treating sewage and polluted water which is very efficient for such purposes as compared to conventional methods.

Further objects and advantages may be apparent from the following specification and appended claims.

Broadly described, the present invention provides a method for treating sewage and polluted waters.

(a) Mixing fecal excrement from pregnant cows with water and fermentation inducing material to produce a mixture having an independent aqueous-phase, (b) Maintaining said mixture in a first digestion zone for a time period requisite to provide a supernatant fluid having a pH in the range of from about 5.8 to about 6.9, (c) Removing a portion of said supernatant fluid from said first digestion zone, (d) Diluting said supernatant fluid portion with from about 0.6 to about 1.4 parts by weight water per part by weight supernatant fluid, (e) Maintaining said diluted supernatant fluid in a second digestion zone for a time period requisite to provide a concentrate fluid having a pH in the range of from about 6.2 to about 7.0, (f) Removing a portion of said concentrate fluid from said second digestion zone, (g) Diluting said portion of concentrate fluid with from about 20 to about 30 parts by weight water per part by weight concentrate fluid, (h) Allowing said diluted concentrate fluid to stand in a third digestion zone for a period requisite to provide an aqueous microorganism containing composition having a pH greater than about 7.0, and (i) Removing some of said composition from said third digestion zone and constantly adding said material removed from said third zone to a stream of polluted water.

The excrement contemplated for utilization, in the method of the present invention, is a collection of the fecal excrements of lactating and pregnant cows either alone or in admixture with other animal excrement. The essential constituent is the fecal excrement from pregnant cows, and collections of excretions of this type constitute the more preferred starting materials in the method of the invention. Although excrement which previously has been modified by physical means, such as by filtration and the like, suitably may be employed unmodified collections of excretions are preferred.

In accordance with the method of the present invention, the only microorganisms which are required to provide the desired aerobic promoting compositions from suitable excrement mixtures are those specifically found in the fecal excretions of pregnant cows. Accordingly, valuable products adapted for utilization in sewage disposal can be prepared from the fecal excretions of pregnant cows without the use of microorganisms from other sources.

In the method of the invention, the excrement, preferably an unfiltered collection of fecal excretions from pregnant cows, initially is mixed with water to provide a mixture having an independent aqueous-phase. The particular amount of water which suitably may be employed will vary, but usually is in the range of from about 0.6 to about 1.4, preferably from about 0.8 to about 1.2, parts by weight per part by weight of the excrement collection.

A fermentation inducing material is then added to the above mentioned independent aqueous-phase containing the fecal excretions. Such fermentation inducing material is preferably yeast which may be added in various proportions, however, for the purpose of insuring rapid fermentation, about three pounds of yeast may be introduced in proportion to about twenty thousand gallons of the above mentioned independent aqueous-phase.

The excrement-water mixture is then allowed to stand in a first digestion zone for a time period requisite to produce a supernatant fluid characterized by a pH in the range of from about 5.8 to about 6.9, preferably from about 6.2 to about 6.8. The particular time period which is involved will vary, depending inter alia, upon the temperature of the mixture, the composition of the excrement, the initial concentration of the mixture, and the desired final pH of the supernatant fluid. Preferably, the temperature of the mixture is maintained in the range of from about 40° to about 90° F., and more preferably between about 60° and 90° F. At such temperatures, the desired final pH of the supernatant fluid is obtained in a period of between about 5 and about 40 days with the higher temperatures effecting more rapid final pH attainment.

During the digestion of the excrement in the first digestion zone, certain spent residues are formed and rise to the surface of the aqueous mixture. These residues preferably are removed periodically and discarded with a removal of these materials at daily intervals being satisfactory.

The digestion of excrement in the first digestion zone may be carried out as a batch or continuous process. In a batch-type process, the incorporation of additional excrement into the digestion mixture may be required to achieve the desired supernatant fluid. When the digestion is desired to be carried out in a continuous manner, additional excrement periodically must be added to the digestion mixture. Preferably, such additions of excrement are effected daily in increments approximating the amounts of spent excrement which are removed.

When the desired digestion of excrement has been effected in the first digestion zone, the supernatant fluid thereby obtained is removed therefrom to be diluted with water and sent to a second digestion zone. The removal of all of the supernatant fluid from the first digestion zone may be effected whereby a filtration thereof may be necessary. Alternatively, portions of the fluid periodically may be removed by withdrawing fluid from the digestion zone at a point which is intermediate the surface of the digestion mixture and the interface of the excrement solid phase and the independent aqueous-phase of the digestion mixture.

A portion of the supernatant fluid obtained from the first digestion zone is then diluted with from about 0.6 to about 1.4, preferably from about 0.8 to about 1.2, parts by weight water per part by weight of the fluid, and the diluted fluid resulting thereby is passed to the second digestion zone. The diluted supernatant fluid is maintained in the second digestion zone for a time period requisite for a concentrate fluid to be obtained which is characterized by a pH in the range of from about 6.2 to about 7.0, preferably from about 6.5 to about 7.0.

The particular time period which the diluted supernatant liquid is maintained in the second digestion zone again will vary depending upon such factors as the characteristics of the supernatant fluid, the amount of water employed in the dilution of the supernatant fluid, and the desired pH of the concentrate fluid. Usually a time period in the range of between about 18 and 30 hours is satisfactory. When concentrate fluids are prepared by a method of the invention utilizing the preferred materials and conditions, recited hereinabove, the maintenance time in the second digestion zone preferably is in the range of from about 22 to about 26 hours.

In one embodiment of the method of the invention, supplemental inorganic and/or organic compounds such as calcium carbonate, vitamins, and/or vitamin-containing substances are added to the liquid in the second digestion zone. Such materials may be employed to complement the activity of the active substances present in the concentrate fluid and/or the digestion promoting compositions ultimately obtained in the process of the invention.

Concentrate fluid obtained in the second digestion zone is then removed therefrom, diluted with additional water, and passed to a third digestion zone. The amount of water employed in the dilution of the concentrate fluid is in the range of from about 20 to about 30, preferably from about 24 to about 26, parts by weight per part by weight concentrate fluid. In view of the large amount of water involved in the dilution step of the process, it is preferable when the process is carried out on a sizable scale to divide the concentrate fluid into several portions prior to dilution.

The diluted concentrate fluid is maintained in the third digestion zone for a time period requisite for the production of micro-organism-containing composition having a pH of at least about 7.0 preferably from about 7.0 to about 8.2. The time period usually required is at least about 50 hours, and preferably at least about 65 hours.

The material or composition produced in accordance with the foregoing may be removed from the third zone on a constant basis by feeding the third zone continuously with water and supernatant fluid from the second digestion zone. This supernatant fluid carries properly balanced nutritional elements for growth of the aerobic digestion organisms. The third zone must, therefor, be fed each day with concentrate from the second zone and also water in order to continuously produce sufficient material in the third zone for removal and constant addition thereof to sewage or polluted water, as will be hereinafter described.

It will be understood that in sewage treatment, there will be a constant flow of polluted water into a sewage plant and in streams or other moving water bodies, pollution control will require a constant addition of the composition from said third zone in order to induce the active growth of aerobic organisms in the sewage, to reduce the same to dispose of undesirable materials therein.

In accordance with the present invention, composition material may be removed from the third digestion zone and placed in a separate tank daily on an intermittent basis and the material may be pumped from the separate tank constantly into sewage or polluted water running in a constant stream, either into a sewage plant or in a regular waterway.

In the event composition material is taken from the third digestion zone on a constant flow basis, concentrate from the second digestion zone is added to the third digestion zone together with water in proportions approximating one gallon of supernatant fluid to one thousand gallons in the third digestion zone. The third digestion zone is sized, such that the required amount of material taken therefrom will not exceed approximately fifty percent of the total capaicty of the third digestion zone in a 24 hour period. Optimum withdrawal of material from the third digestion zone is preferably around forty percent of the total capacity of the third digestion zone and therefore the sizing of this third digestion zone will be proportioned to the amount of material to be withdrawn for proper inoculation or addition of such material withdrawn from the third zone to a stream of polluted water flowing into a sewage plant or in a regular waterway.

It will also be understood that withdrawal of material from the third zone shall not exceed an amount which will bring the pH of the material in the third digestion zone below 7.0.

The material in the third digestion zone should appear to be a light green and the pH will preferably range from between 7.6 to 12.0. A general guide for the pH will be 0.5 to 1.0 above the pH of the water supply used for feeding the third zone.

In warm weather, gas bubbles may be noted at the sides of the third digestion zone and in cold weather, these bubbles may be more difficult to see.

A desirable temperature range of the third digestion zone should be from between 50° to 90° F. for best results.

A light green algae will grow in the third digestion zone under these conditions and this is desirable since aerobic conditions must be present.

In practicing control of composition and to insure that it is effective, one must recognize desirable and undesirable conditions in the third digestion zone by way of a pH reading, as hereinbefore pointed out, and further, by visual methods.

When a blue-green, brown, reddish-brown algae or red slime become present in the third digestion zone, the composition is ineffective. These conditions may be attended by an anaerobic smell which is sour and very offensive.

To correct the foregoing anaerobic conditions, the surfaces of the third digestion zone which may be a conventional tank, should be wiped clean with a moist cloth or scrubbed with a brush and then the material in the third digestion zone should be heavily drawn upon, as for example, up to fifty percent of the capacity of the third digestion zone should be drawn away each 24 hours and make-up water and material from the second digestion zone should be added regularly with the withdrawal from the third digestion zone.

If the conditions of the composition do not return to normal, as hereinbefore described, then the third digestion zone tank should be completely emptied and thoroughly scrubbed whereupon a new culture from the dilution of the second digestion zone should be placed in the third digestion zone, together with a proper proportion of water.

As hereinbefore described, an optimum withdrawal of material from the third digestion zone should equal approximately forty percent of the total volume thereof each 24 hours.

When the composition in the third digestion zone is removed to a separate holding tank, it may be removed on an intermittent daily basis or constantly, as desired, and the product composition is removed from the holding tank and constantly pumped at a constant rate into a stream of polluted water, such as sewage entering a sewage plant. Thus, a separate holding tank may be equal to approximately forty or fifty percent of the total displacement of the third digestion zone and material from the holding tank may then be metered or dispersed over a 24 hour period by suitable metering system into the influent portion of a sewage treatment plant or waste water treatment plant or polluted waters, streams, lakes, rivers, etc., for the effect of pollution treatment and control.

The amount of material from the holding tank which is added to sewage may be in the ratio of three thousand parts of the composition to one million gallons of sewage or polluted water flowing in a stream either into a sewage plant or through a regular waterway.

This ratio of the composition to the polluted water should be maintained until the effluent material is under control with the desired effect attained. The action of the bacteria and/or enzymes of the composition in the sewage increases oxygen content, reduces odor to a minimum, reduces fats and greases, reduces the sludge and solids in the effluent, as well as reducing the general maintenance costs of the plant. Further, a reduction and control of pathogenic microorganisms is one of the principal effects of the method of the invention.

In addition, efficient control of detergent foam is maintained so that aerobic conditions may prevail and an increase of oxygen content in the solid water further helps to maintain aerobic conditions and the final result is that the polluted water is salvaged and may be usable for irrigation or industrial purposes.

By the use of the method of the present invention, lakes, streams, rivers and other water bodies that are polluted can be effectively treated and controlled. This may be done by the use of a number of small treatment plants installed at various locations where waste water is being introduced into a body of water or where streams of polluted water flow.

The composition product of the invention may be produced in one single large plant and pumped directly into a body of water for the treatment of pollution therein.

The invention having been generally described, the following examples are given to illustrate embodiments of the invention, the examples are given for illustration purposes only and are not intended in any way to limit the scope of the invention.

*Example 1*

One hundred parts by weight of a collection of unfiltered fecal excrements from pregnant cows are placed in a suitable vessel and diluted with about 100 parts by weight of fresh water.

Approximately 0.5 part of yeast may be added to the foregoing mixture of water and fecal excrements to induce a fermentation of these materials. The foregoing aqueous mixture, together with the yeast, should be maintained at a temperature ranging between about 40° and about 60° and allowed to stand for about 30 days. During this period residues which form in the mixture and float to the surface should be removed daily and discarded. Fresh excrement may be added daily to the mixture in amounts approximating the amounts of residue removed. At the end of about 30 days supernatant fluid having a pH of about 6.5 may be formed from the mixture.

About 50 parts by weight of the supernatant fluid thereby obtained may then be drawn from the vessel and placed into a second vessel and diluted with about 50 parts by weight of fresh water. The resulting diluted supernatant fluid is then allowed to stand in the vessel for about 24 hours, after which time, a concentrate fluid is produced which may have a pH of about 6.8.

About 4 parts by weight of the concentrate fluid may then be placed in a third vessel diluted with about 100 parts by weight of fresh water and the resulting mixture may then be allowed to stand for about 72 hours and after this period of time, a microorganism containing composition may be characterized by a pH of about 7.5.

The material from the third vessel may be withdrawn at an optimum rate of forty percent of the total volume of the vessels for each 24 hour period and may be added to a stream of sewage entering a sewage plant or a stream of polluted water flowing in a regular stream bed or may be added to a static body of water, such as a pond or lake, if desired, for pollution control therein.

When the composition from the third vessel or holding tank is added to polluted water or a body of water containing pathogenic organisms, a ratio of 2 gallons of the composition from the third vessel or holding tank in proportion to 50 gallons of the sewage or polluted water will be effective in completely destroying the pathogenic organisms in the polluted water or sewage.

It will therefore be understood that the rate at which undesirable materials in sewage and polluted water are to be reduced will depend upon the amount of the materials from the third vessel or third digestion zone which may be added to such polluted water or sewage.

Various modifications of the present invention may be resorted to in a manner limited only by a just interpretation of the following claims.

I claim:

1. A method for treating polluted water which comprises:
   (a) mixing fecal excrement from pregnant cows with water and a fermentation inducing material to produce a mixture having an independent aqueous-phase,
   (b) maintaining said mixture in a first digestion zone for a period requisite to provide a supernatant fluid having a pH in the range of from about 5.8 to about 6.9,
   (c) removing a portion of said supernatant fluid from said first digestion zone,
   (d) diluting said supernatant fluid portion with from about 0.6 to about 1.4 parts by weight water per part by weight supernatant fluid, (e) maintaining said diluted supernatant fluid in a second digestion zone for a time period requisite to provide a concentrate fluid having a pH in a range of from about 6.2 to about 7.0, (f) removing a portion of said concentrate fluid from said second digestion zone, (g) diluting said portion of concentrate fluid with from about 20 to about 30 parts by weight water per part by weight concentrate fluid allowing said diluted concentrate fluid to stand in a third digestion zone for a time period requisite to provide an aqueous microorganism containing composition having a pH greater than about 7.0, and (h) removing some of said composition from said third digestion zone and constantly adding said material removed from said third zone to a stream of polluted water.

2. The method for treating sewage according to claim 1, wherein additional excrement is introduced incrementally into the mixture in said first digestion zone during the digestion of said mixture.

3. The method in accordance with claim 1, wherein the mixture in said first digestion zone is maintained at a temperature in the range of from about 40° to about 90° F. during the digestion of said mixture.

4. The method is accordance with claim 1, wherein the amount of dilution water employed in said first digestion zone is in a range of from about 0.8 to about 1.2 parts by weight water per part by weight said excrement, the amount of dilution water employed in said second digestion zone is in the range of from about 0.8 to about 1.2 parts by weight per part by weight said supernatant fluid, and the amount of dilution water employed in said third digestion zone is in the range of from about 24 to about 26 parts by weight per part by weight said concentrate fluid.

5. The method in accordance with claim 1, wherein said supernatant fluid has a pH in the range of from about 6.2 to about 6.8, said concentrate fluid has a pH in the range of from about 6.5 to about 7.0, and said microorganism containing composition has a pH in the range of from about 7.0 to about 12.0.

6. The method in accordance with claim 1, wherein the excrement containing mixture is maintained in said first digestion zone for a time period in the range of from 5 to about 40 days, said supernatant fluid is maintained in said second digestion zone for a time period in the range of from about 18 to about 30 hours, and said concentrate fluid is maintained in said third digestion zone for a time period of about 24 to 50 hours.

7. The method in accordance with claim 1, wherein calcium carbonate is added to the liquid in said second digestion zone.

8. The method in accordance with claim 1, wherein vitamins are added to the liquid in said second digestion zone.

9. A method in accordance with claim 1, wherein the amount of said composition removed from said third digestion zone is less than fifty percent of the total volume in said third zone during any 24 hour period.

10. The method in accordance with claim 1, wherein the amount of said composition removed from said third digestion zone is approximately forty percent of the total volume of said third digestion zone for any 24 hour period.

11. The method in accordance with claim 1, wherein the amount of said composition removed from said third digestion zone relative to the amount of polluted water to which it is added may approximate a ratio of 1 to 1000.

12. The method in accordance with claim 1, wherein the amount of said composition removed from said third digestion zone and added to said polluted water is in a ratio of approximately 2 gallons of said composition to 50 gallons of polluted water.

13. The method in accordance with claim 1, wherein said fermentation inducing material comprises yeast.

14. A method for treating polluted water which comprises:

(a) mixing fecal excrement from pregnant cows with water and a fermentation inducing material to produce a mixture having an independent aqueous-phase, (b) maintaining said mixture in a first digestion zone for a period requisite to provide a supernatant fluid having a pH in the range of from about 5.8 to about 6.9, (c) removing a portion of said supernatant fluid from said first digestion zone, (d) diluting said supernatant fluid portion with from about 0.6 to about 1.4 parts by weight water per part by weight supernatant fluid, (e) maintaining said diluted supernatant fluid in a second digestion zone for a time period requisite to provide a concentrate fluid having a pH in a range of from about 6.2 to about 7.0, (f) removing a portion of said concentrate fluid from said second digestion zone, (g) diluting said portion of concentrate fluid with from about 20 to about 30 parts by weight water per part by weight concentrate fluid allowing said diluted concentrate fluid to stand in a third digestion zone for a time period requisite to provide an aqueous microorganism containing composition having a pH greater than about 7.0, and (h) removing some of said composition from said third digestion zone and adding said material removed from said third zone to polluted water.

References Cited

UNITED STATES PATENTS 2,227,648    1/1966    Hahn et al. _____ 210—11 X

MICHAEL E. ROGERS, *Primary Examiner*.